Jan. 13, 1931.    D. HANAUER    1,788,867
INTERLOCKED CROSSED HELICAL SPRINGS
Filed Feb. 25, 1927
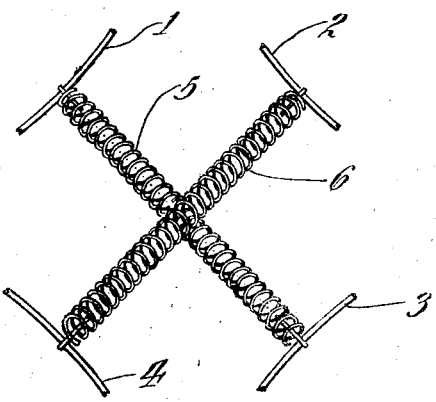
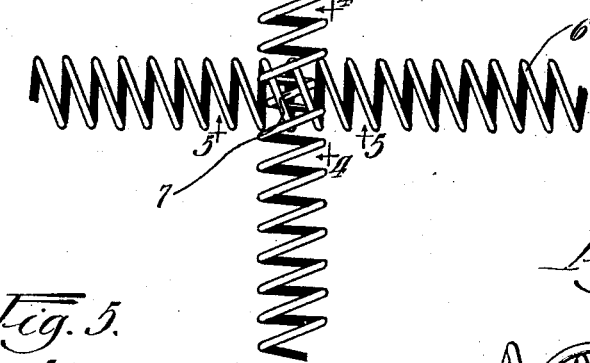
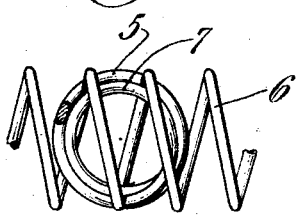
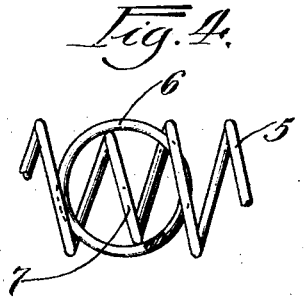
Inventor:
Darwin Hanauer,
By Wm. F. Freudenreich,
Atty.

Patented Jan. 13, 1931

1,788,867

UNITED STATES PATENT OFFICE

DARWIN HANAUER, OF LA GRANGE, ILLINOIS, ASSIGNOR TO ROME COMPANY, INC., A CORPORATION OF NEW YORK

INTERLOCKED CROSSED HELICAL SPRINGS

Application filed February 25, 1927. Serial No. 171,059.

In spring cushions, such as bed springs for example, made of vertical spiral springs whose lower ends are fixed to portions of the frame structure, the upper rings of the springs must be tied together to keep the springs upright. The most common way of tying the rings together is to place two crossed small helical springs between each group of main springs, fastening each end of the small springs to an upper ring of a main spring. Thus each helical spring ties two main springs together and, at the same time anchors them to a tie between two other main springs. The helical springs are commonly screwed one through the middle of the other, locking them against endwise movement with respect to each other when assembled in the cushion. However, the interlock between two similar crossed or intersecting helical springs is not absolute in respect of movements out of the plane containing the long axes of the springs or, roughly speaking, the springs themselves; such relative movements over distances equal to the diameter of the tie springs being possible. The result is that as the top of the spring cushion flexes in use, one top ring or coil being depressed below an adjacent ring, the tie springs slip on each other and produce squeaky noises and scrape off the paint with which they are covered.

The object of the present invention is to overcome the objectionable feature that I have just explained.

To this end the tie springs are fastened together at their intersection to prevent relative displacement out of their common plane. This may be done in various ways but, in order to secure the greatest advantage from my invention, there should be a minimum of extra material and labor involved. In the preferred way of carrying out my invention I so shape one or both of a pair of tie springs that when they are placed across each other with their long axes in the same plane they are automatically locked against displacement out of such plane.

Therefore, considered in one of its aspects, my invention may be said to have for its object so to construct a helical spring that when two are crossed with their long axes in the same plane they will be locked against relative displacement out of such plane.

The usual way of crossing two tie springs is to place the end of one against the side of the other and rotating it so as to screw it through the other. Viewed in another aspect, the present invention may be said to have for its object so to construct a helical spring that when two springs are screwed together so as to extend across each other in a common plane they shall be interlocked against relative displacement out of such plane.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a plan view of a fragment of a spring cushion, showing parts of four coils or rings tied together by two crossed helical springs; Fig. 2 is an elevation on a larger scale, of the middle section of one of the tie springs; Fig. 3 is a plan view of the interlocked tie springs; Fig. 4 is a section on line 4—4 of Fig. 3; and Fig. 5 is a section on line 5—5 of Fig. 3.

Referring to the drawing, 1, 2, 3 and 4 represent fragments of the upper rings or coils of four spiral springs adjacent to each other in a spring cushion. 5 and 6 are two crossed and interengaged helical springs of comparatively small diameter secured at their ends to the four rings of the main springs in any usual or suitable way.

I have found that by making one of the coils of one spring smaller than the remainder in that section that is crossed by the other spring, the small coil will nest itself within the latter spring and form a positive lock against relative displacement out of the plane containing the springs. This small coil preferably has an external diameter about equal to the internal diameter of the other coils, as indicated at 7, so that it may fit inside of the tube or hollow cylinder formed by the other spring. As will be seen from Figs. 4 and 5, the spring 6 cannot move up or down without carrying the coil 7 along, and therefore there can be no relative displacement of the springs out of their common plane. In order that the long axes of the springs may lie in the same plane, the center of the small coil must be in the long axis of the spring 5.

The springs 5 and 6 are assembled in the usual way by screwing the spring 6 through the spring 5, care being taken to start the screwing operation at the proper point to bring the small coil 7 inside of the spring 6.

It will thus be seen that I have overcome the objectionable features of spring cushions having crossed helical tie springs resulting from the slipping of the tie springs upon each other in vertical direction; this being accomplished in the preferred form of my invention by means involving no additional material or operation either in the process of manufacture or assembly, provided the small coil is formed while the spring is being made. Consequently my improvement, in its preferred form, adds nothing to the cost of making a cushion.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. Two similar crossed coiled springs screwed into one another, one of the springs having a turn of the same diameter as the internal diameter of the other spring fitting within the latter at the intersection.

2. Two similar crossed coiled springs screwed one through the other so as to be interlocked against disengagement, one of the springs having a turn of approximately the same diameter as the internal diameter of the other spring fitting within the bore of the latter at the intersection of the springs, the turn of small diameter having its center at the long axis of the spring of which this turn forms a part.

3. The combination with the upper rings of four adjacent vertical cushioning springs, of two intersecting coiled springs extending diagonally between said rings and tying them together, said coiled springs being screwed one into the other so as to be interlocked against separation while attached to said rings, one of said coiled springs having a turn fitting inside of the bore of the other coiled spring at the intersection of the coiled springs.

In testimony whereof, I sign this specification.

DARWIN HANAUER.